(12) United States Patent
Eaton

(10) Patent No.: US 8,168,243 B1
(45) Date of Patent: May 1, 2012

(54) COFFEE PRESS GROUNDS REMOVER APPARATUS

(76) Inventor: Phyllis Eaton, Greeley, CO (US)

( * ) Notice: Subject to any disclaimer, the term of this patent is extended or adjusted under 35 U.S.C. 154(b) by 25 days.

(21) Appl. No.: 12/928,465

(22) Filed: Dec. 13, 2010

Related U.S. Application Data

(63) Continuation-in-part of application No. 11/712,857, filed on Mar. 1, 2007, now abandoned.

(60) Provisional application No. 60/823,619, filed on Aug. 25, 2006, provisional application No. 60/767,110, filed on Mar. 3, 2006.

(51) Int. Cl.
*A47J 31/057* (2006.01)
*B65B 29/02* (2006.01)

(52) U.S. Cl. ............... 426/77; 99/304; 99/306; 426/82

(58) Field of Classification Search .............. 426/77, 426/82; 99/304, 306
See application file for complete search history.

(56) References Cited

U.S. PATENT DOCUMENTS 5,363,745 A * 11/1994 Lin ................................ 99/306
6,009,793 A *  1/2000 Blankenship et al. .......... 99/307

* cited by examiner

*Primary Examiner* — Brent Ohern
(74) *Attorney, Agent, or Firm* — Emery L. Tracy

(57) ABSTRACT

A coffee press grounds removal apparatus for removing coffee grounds or tea leaves from a coffee press machine is provided. The coffee press machine has a plunger apparatus for pressing the coffee grounds or tea leaves within a carafe. The apparatus comprises a basket receivable within the carafe with the basket having an open top, a bottom wall, and a side wall extending in a generally upward direction from the bottom wall toward the open top. A handle is pivotally connected to the basket wherein the basket is completely receivable within the carafe. The basket comprises a configuration substantially mirroring the interior circumference and shape of the carafe in which the basket is seatable wherein as the basket is inserted into the carafe, the basket slidably engages the interior circumference of the carafe such that an outer surface of the side wall of the basket contacts the interior circumference of the carafe. The entire bottom wall contacts a bottom surface within the carafe with the bottom wall sandwiched between the coffee grounds or tea leaves and the bottom surface and the plunger apparatus pressable against the coffee grounds or tea leaves.

16 Claims, 3 Drawing Sheets

COFFEE PRESS GROUNDS REMOVER APPARATUS

The present application is a continuation-in-part of patent application Ser. No. 11/712,857, filed Mar. 1, 2007 now abandoned, entitled "Coffee Press Grounds Remover Apparatus", which claims benefit of priority of provisional patent application Ser. No. 60/823,619, filed on Aug. 25, 2006, entitled "Coffee Press Grounds Remover" and provisional patent application Ser. No. 60/767,110, filed on Mar. 3, 2006, entitled "Coffee Press Grounds Remover".

BACKGROUND OF THE INVENTION

1. Field of the Invention

This invention relates generally to a coffee press grounds remover apparatus and, more particularly, the invention relates to a coffee press grounds remover apparatus having an assembly for containing the coffee grounds or tea leaves within a cylindrical type carafe such that once the coffee or tea liquid is removed, the coffee grounds or tea leaves are quickly and efficiently removed in their entirety.

2. Description of the Prior Art

French press type coffee makers have been available for many years. Such an apparatus typically includes a cylindrical type container having an open top called a carafe. The top is provided with a lid that receives a rod that may slide up and down within the container. The rod further comprises a handle at an upper end and a press at its lower end. The rod and the press with the lid comprise a plunger assembly. The press generally is comprised of a screen type material that enables the passage of fluids while inhibiting flow of any particulates such as tea leaves or coffee grounds.

In a typical arrangement, coffee or tea is placed in the bottom of the cylindrical type container. Hot water is added to the container and allowed to steep for an appropriate period of time. Once steeped, the plunger assembly is depressed into the container thereby trapping the tea leaves or coffee grounds beneath it. The liquid coffee or tea may then be removed.

One problem with the traditional type coffee press is that simple, quick, effective and reliable removal of coffee grounds or tea leaves from the bottom of the container is difficult to achieve. For example, it may be necessary to scoop the grounds from the bottom of the container and this does not effectively remove all the grounds from within.

SUMMARY

The present invention is a coffee press grounds removal apparatus for removing coffee grounds or tea leaves from a coffee press machine. The coffee press machine has a plunger apparatus for pressing the coffee grounds or tea leaves within a carafe. The apparatus comprises a basket receivable within the carafe with the basket having an open top, a bottom wall, and a side wall extending in a generally upward direction from the bottom wall toward the open top. A handle is pivotally connected to the basket wherein the basket is completely receivable within the carafe. The basket comprises a configuration substantially mirroring the interior circumference and shape of the carafe in which the basket is seatable wherein as the basket is inserted into the carafe, the basket slidably engages the interior circumference of the carafe such that an outer surface of the side wall of the basket contacts the interior circumference of the carafe. The entire bottom wall contacts a bottom surface within the carafe with the bottom wall sandwiched between the coffee grounds or tea leaves and the bottom surface and the plunger apparatus pressable against the coffee grounds or tea leaves.

In addition, the present invention includes a coffee press grounds removal apparatus for removing coffee grounds or tea leaves from a coffee press machine. The coffee press machine has a plunger apparatus for pressing the coffee grounds or tea leaves within a carafe. The apparatus comprises a basket receivable within the carafe with the basket having an open top, a flat bottom wall, and a side wall extending in a generally upward direction from the bottom wall toward the open top. A plurality of apertures is formed in the bottom wall with the apertures sized and shaped for maintaining the coffee grounds or tea leaves within the basket. A handle is pivotally connected to the basket with a hinge mechanism connecting the handle with the basket enabling the handle to pivot between zero (0°) degrees while laying within the basket to one hundred and eighty) (180°) while at rest within the basket on the opposite side of the basket and all angles in between zero (0°) degrees and one hundred and eighty (180°) degrees. The basket is completely receivable within the carafe and comprises a configuration substantially mirroring the interior circumference and shape of the carafe in which the basket is seatable. As the basket is inserted into the carafe, the basket slidably engages the interior circumference of the carafe such that an outer surface of the side wall of the basket contacts the interior circumference of the carafe and the entire bottom wall contacts a bottom surface within the carafe with the bottom wall sandwiched between the coffee grounds or tea leaves and the bottom surface and the plunger apparatus pressable against the coffee grounds or tea leaves.

DETAILED DESCRIPTION OF THE PREFERRED EMBODIMENTS

Figure 1:
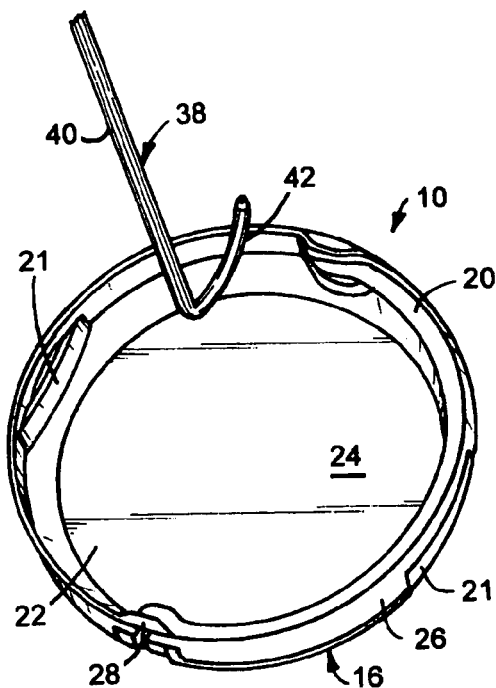
FIG. 1 is a top perspective view illustrating a coffee press grounds removal apparatus, constructed in accordance with the present invention.
Figure 2:
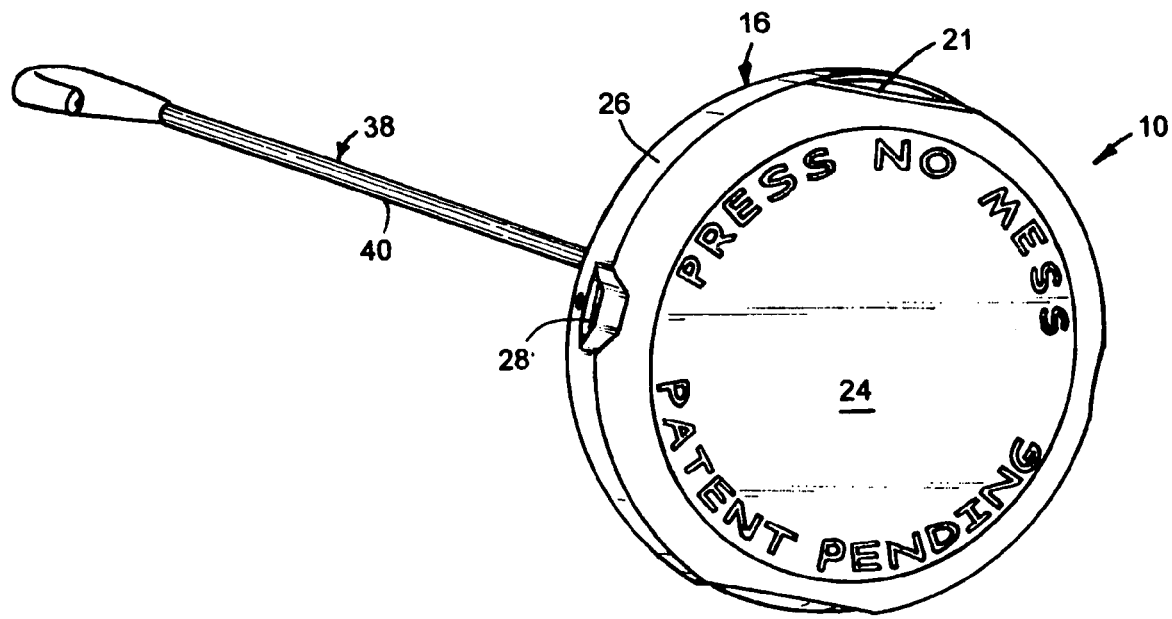
FIG. 2 is a bottom perspective view illustrating the coffee press grounds removal apparatus, constructed in accordance with the present invention.
Figure 4:
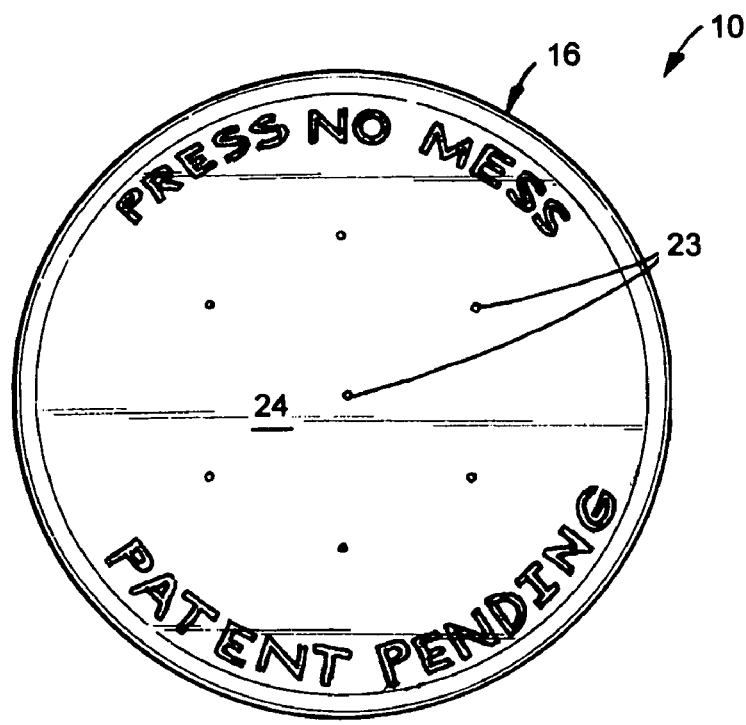
FIG. 4 is a top plan view illustrating the coffee press grounds removal apparatus, constructed in accordance with the present invention.
Figure 3:
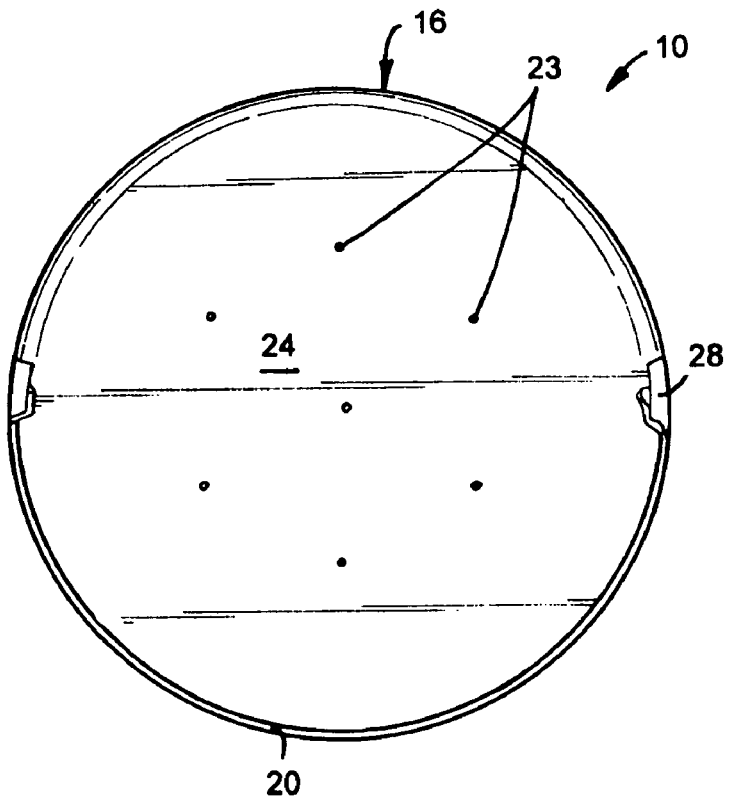
FIG. 3 is a bottom plan view illustrating the coffee press grounds removal apparatus, constructed in accordance with the present invention.
Figure 5:
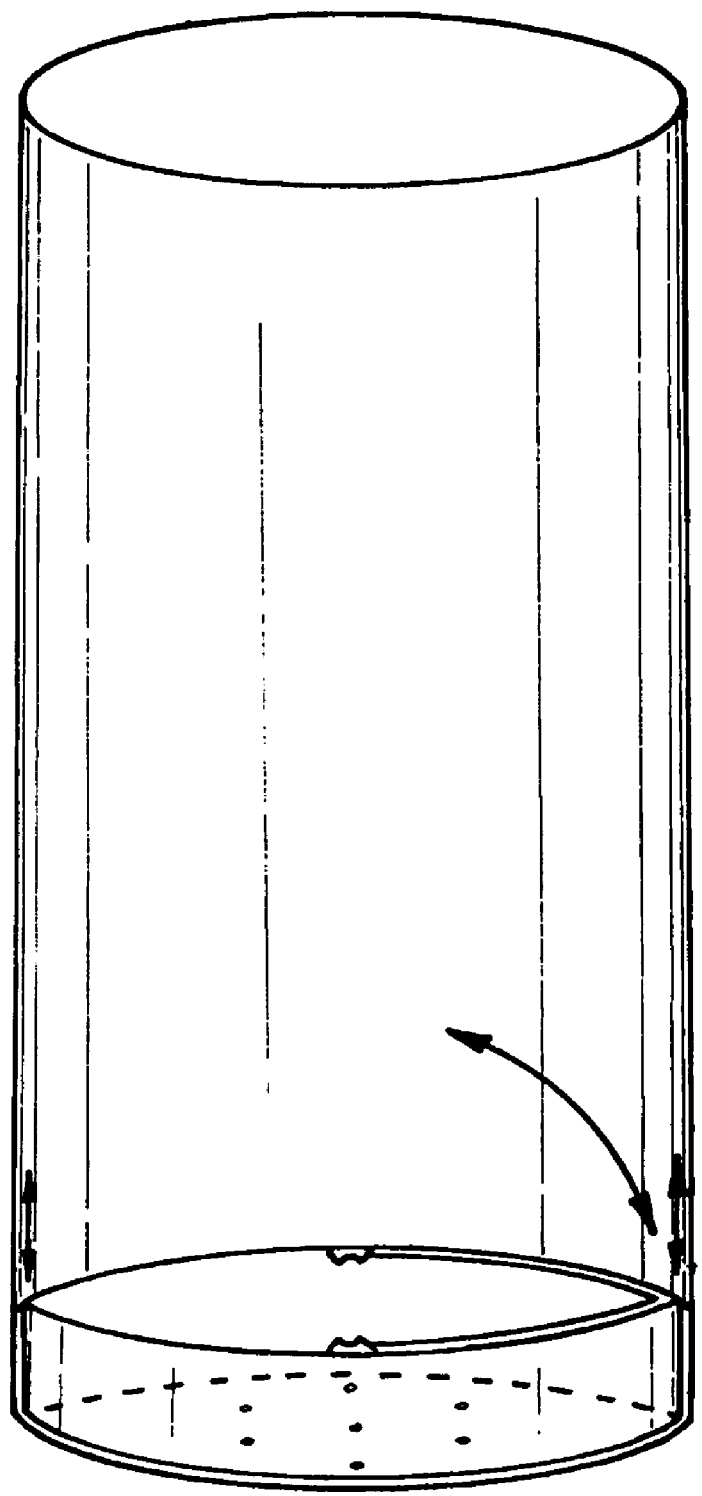
FIG. 5 is an elevational side view illustrating the coffee press grounds removal apparatus, constructed in accordance with the present invention, with the coffee press grounds removal apparatus positioned within a carafe.

Accordingly, as illustrated in FIGS. 1-5, the present invention is a coffee press grounds removal apparatus, indicated generally at 10, for a coffee press having an assembly for containing the coffee grounds or tea leaves within a cylindrical type carafe 12 such that once the coffee or tea liquid is removed, the coffee grounds or tea leaves may be quickly and efficiently removed in their entirety.

The apparatus 10 of the present invention comprises a basket 16 for receiving and containing the coffee grounds or tea leaves. The basket 16 has a basket handle 20 pivotally mounted to the basket 16. A pair of handle supports 21 is formed in the basket 16 allowing the basket handle 20 to rest upon either of the handle supports 21 for easily hooking the basket handle 20, as described further below. Without the handle supports 21, the basket handle 20 could fall further into the basket 16 and possible into the coffee grounds/tea leaves making grasping of the basket handle 20 and retrieval of the basket 16 more difficult.

The carafe 12 comprises an interior cylindrical surface of a predetermined circumference. The basket 16 has a substantially cylindrical shape approximating the interior circumference of the carafe 12, that is, the basket 16 is sized to substantially approximate the interior surface of the carafe 12. Therefore, it is within the scope of the present invention for the apparatus 10 to have any size. Accordingly, the basket 16 slidably engages the interior circumference of the carafe 12 forming a relatively tight fit. In addition, the basket 16 is designed to prevent grounds and/or tea leaves from escaping the basket 16 and residing between the walls of the basket 16 and the interior walls of the carafe 12. As such, it is within the scope of the present invention for the entire outer surface of the basket 16 to contact the interior circumference of the basket 16.

Preferably, the basket 16 of the apparatus 10 of the present invention has an open top 22, a bottom wall 24, and a side wall 26 positioned between the open top 22 and the bottom wall 24. Preferably, the bottom wall 24 is both solid and flat. The flat bottom surface allows the basket 16 to rest flat on a bottom surface within the carafe. As the plunger apparatus of the coffee press is inserted into the basket 16, the plunger apparatus presses the coffee grounds or tea leaves, sandwiching the bottom wall 24 of the basket 16 between the coffee grounds or tea leaves and the bottom surface of the carafe without any deformation of the bottom wall 24.

The basket 16 of the apparatus 10 of the present invention can be constructed of any material which can withstand hot temperatures. A plurality of apertures 23 can be formed in the bottom wall 24 of the basket 16. The apertures 23 are sized and shaped allowing fluids to flow therethrough but inhibiting the flow of particulates through the aperture 23. The basket 16 functions to contain the particulates within the carafe 12 to aid in removal therefrom.

As previously stated, the apparatus 10 of the present invention comprises the basket 16 and a handle 20 connected to the basket 16 via a pivoting hinge portion 28. The basket 16 comprises a configuration that substantially mirrors the interior circumference of the carafe 12 and further comprises upwardly extending side walls 24 designed to accommodate an adequate amount of coffee grounds or tea leaves for the carafe 12.

The basket 16 can be constructed from any number of materials that are heat resistant and will block the passage of particulate matter to plastic, nylon, metal, etc. This list is not meant to be limiting, but only to provide a general idea of types of materials that could be used. One of skill in the art would recognize any of a plurality of materials that would work with the invention as described herein. The side walls 34 of the basket 16 are sized at an appropriate height to contain enough coffee grounds or tea leaves appropriate for the size of the carafe 12. In one embodiment, for example, the side walls 34 of the basket 16 are approximately two (2 cm) centimeters high.

The handle portion 20 of the basket 16 can be constructed from any heat resistant material that retains its shape and is strong enough to support the contents of the basket 16. Further, the handle portion 20 includes a simple arched structure engageable with a hook type apparatus 38 for removal. It should be noted that while the present invention has been described as having a hook 38 to retrieve the basket 16, a user does not have to use the hook 38 and can use their hands or other.

As discussed, the apparatus 10 of the present invention further includes the hook type apparatus 38. The hook type apparatus 38 includes any of a plurality of shapes. In one embodiment, the hook 38 comprises a longitudinally extending portion 40 with a hooked end portion 42. The hooked end portion 42 comprises a shape to engage with the basket handle 20 to retrieve the basket 16 from within the carafe 12. For example, the hook 38 can adopt a structure similar to a crochet needle having a looped end to connect or engage with the basket handle 20 and a long straight part to extend within the carafe 12. The hook 38 can be constructed from any of a plurality of materials that are heat resistant and that are strong enough to maintain their structure to facilitate removal of the basket 16 from within the carafe 12.

As previously discussed, the apparatus 10 of the present invention further comprises a hinge portion 28 where the basket handle 20 connects with the basket 16. The hinge connector portion 28 can include any number of hinges known in the art, for example, a ball and socket type joint, a hole in the basket 16 that receives a loop type structure, etc. Generally, the hinge portion 28 has any sort of connector element that enables the handle 18 to pivot between zero (0°) degrees while laying on one of the handle supports 21 within the basket 16 to one hundred and eighty (180°) while at rest on another handle support 21 on the opposite side of the basket 16 and all angles in between zero (0°) degrees and one hundred and eighty (180°) degrees. The hinge portion 28 enables the basket handle 20 to rest on the handle supports 21 of the basket 16 during brewing, e.g., to rest on one side of the basket 16 parallel to the bottom of the carafe 12. As such, the basket handle 20 does not prohibit the plunger apparatus from engaging with the coffee grounds/tea leaves in the basket 16 when inserter within the carafe 12 after steeping.

In a further embodiment of the apparatus 10 of the present invention, a disposable filter can be positioned within the basket 16 prior to addition of the grounds or leaves. Once the basket is removed from the carafe 12, the filter containing the grounds or leaves can be lifted out of the basket 16 and disposed of.

In yet another embodiment of the apparatus 10 of the present invention, the basket 16 further comprises a ring or gasket adjacent to the upper edge of the basket 16. The ring or gasket comprises a water resistant flexible material such as rubber or a like material. The ring or gasket is designed to extend slightly past the exterior surface of the basket 16 so that when inserted within the carafe 12, the ring inhibits grounds or leaves from penetrating the area between the interior surface of the carafe 12 and the exterior surface of the basket 16. In addition, the ring or gasket has a squeegee type effect to remove any grounds or leaves that adhere to the sides of the carafe 12 or lip of the basket 16 during removal of the basket 16 from the carafe 12.

In another embodiment of the apparatus 10 of the present invention, the upper edge portion of the basket 16 comprises a lip or outwardly extending portion. The lip functions similar to the gasket described previously to fill any gap between the basket 16 and the interior surface of the carafe 12.

Generally, the grounds are placed within the basket 16 and the basket 16 is placed within the carafe 12. The hot water is added to the carafe 12. After an appropriate amount of time, the plunger apparatus is depressed towards the bottom of the carafe 12 where the press enters the basket 16 thereby trapping the tea leaves or grounds therein. Once the coffee or tea liquid is removed from the carafe 16, the plunger apparatus is removed from the carafe 16. Next, the hook 38 is inserted within the carafe 12 to engage the basket handle 20. The hook 38 is used to retrieve the basket 16 from within the carafe 12. Once removed from the carafe 12, the grounds may be easily emptied from the basket 16 and disposed of.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A coffee press grounds removal apparatus in combination with a carafe for removing coffee grounds or tea leaves from a coffee press machine, the coffee press machine having a plunger apparatus for pressing the coffee grounds or tea leaves within the carafe, the apparatus comprising:
    a basket receivable within the carafe, the basket having an open top, a bottom wall, and a side wall extending in a generally upward direction from the bottom wall toward the open top; and
    a handle pivotally connected to the basket;
    wherein the basket is completely receivable within the carafe;
    wherein the basket comprises a configuration substantially mirroring the interior circumference and shape of the carafe in which the basket is seatable;
    wherein as the basket is inserted into the carafe, the basket slidably engages the interior circumference of the carafe such that an outer surface of the side wall of the basket contacts the interior circumference of the carafe; and
    wherein the entire bottom wall contacts a bottom surface within the carafe, the bottom wall sandwiched between the coffee grounds or tea leaves and the bottom surface, the plunger apparatus pressable against the coffee grounds or tea leaves.

2. The apparatus of claim 1 wherein the entire outer surface of the side wall contacts the interior circumference of the carafe.

3. The apparatus of claim 1 wherein the handle includes a receiving portion engageable with a hook, the receiving portion providing a releasably secure engagement between the hook and the handle.

4. The apparatus of claim 3 wherein the receiving portion is selected from the group consisting of a u-type design and a closed loop.

5. The apparatus of claim 1 and further comprising:
    a hinge mechanism connecting the handle with the basket enabling the handle to pivot between zero (0°) degrees while laying within the basket to one hundred and eighty (180°) while at rest within the basket on the opposite side of the basket and all angles in between zero (0°) degrees and one hundred and eighty (180°) degrees.

6. The apparatus of claim 5 and further comprising:
    at least one handle support formed in the basket, the at least one handle support supporting the handle at an angle perpendicular to the side wall of the basket.

7. The apparatus of claim 1 wherein the bottom wall is flat and the bottom surface of the carafe is flat, the bottom wall being free from deformation during pressing.

8. The apparatus of claim 1 wherein the open top of the basket is positionable below a top edge of the carafe such that the coffee grounds or tea leaves are free to move within the basket and the carafe.

9. The apparatus of claim 1 and further comprising:
    a plurality of apertures formed in the bottom wall, the apertures sized and shaped for maintaining the coffee grounds or tea leaves within the basket.

10. A coffee press grounds removal apparatus in combination with a carafe for removing coffee grounds or tea leaves from a coffee press machine, the coffee press machine having a plunger apparatus for pressing the coffee grounds or tea leaves within the carafe, the apparatus comprising:
    a basket receivable within the carafe, the basket having an open top, a flat bottom wall, and a side wall extending in a generally upward direction from the bottom wall toward the open top;
    a plurality of apertures formed in the bottom wall, the apertures sized and shaped for maintaining the coffee grounds or tea leaves within the basket;
    a handle pivotally connected to the basket;
    a hinge mechanism connecting the handle with the basket enabling the handle to pivot between zero (0°) degrees while laying within the basket to one hundred and eighty (180°) while at rest within the basket on the opposite side of the basket and all angles in between zero (0°) degrees and one hundred and eighty (180°) degrees;
    wherein die basket is completely receivable within the carafe;
    wherein the basket comprises a configuration substantially mirroring the interior circumference and shape of the carafe in which the basket is seatable;
    wherein as the basket is inserted into the carafe, the basket slidably engages the interior circumference of the carafe such that an outer surface of the side wall of the basket contacts the interior circumference of the carafe; and
    wherein the entire bottom wall contacts a bottom surface within the carafe, the bottom wall sandwiched between the coffee grounds or tea leaves and the bottom surface, the plunger apparatus pressable against the coffee grounds or tea leaves.

11. The apparatus of claim 10 wherein the entire of surface of the side wall contacts the interior circumference of the carafe.

12. The apparatus of claim 10 wherein the handle includes a receiving portion engageable with a hook, the receiving portion providing a releasably secure engagement between the hook and the handle.

13. The apparatus of claim 12 wherein the receiving portion is selected from the group consisting of a u-type design and a closed loop.

14. The apparatus of claim 10 and further comprising:
    at least one handle support formed in the basket, the at least one handle support supporting the handle at an angle perpendicular to the side wall of the basket.

15. The apparatus of claim 10 wherein the bottom wall being free from deformation during pressing.

16. The apparatus of claim 10 wherein the open top of the basket is positionable below a top edge of the carafe such that the coffee grounds or tea leaves are free to move within the basket and the carafe.

* * * * *